UNITED STATES PATENT OFFICE.

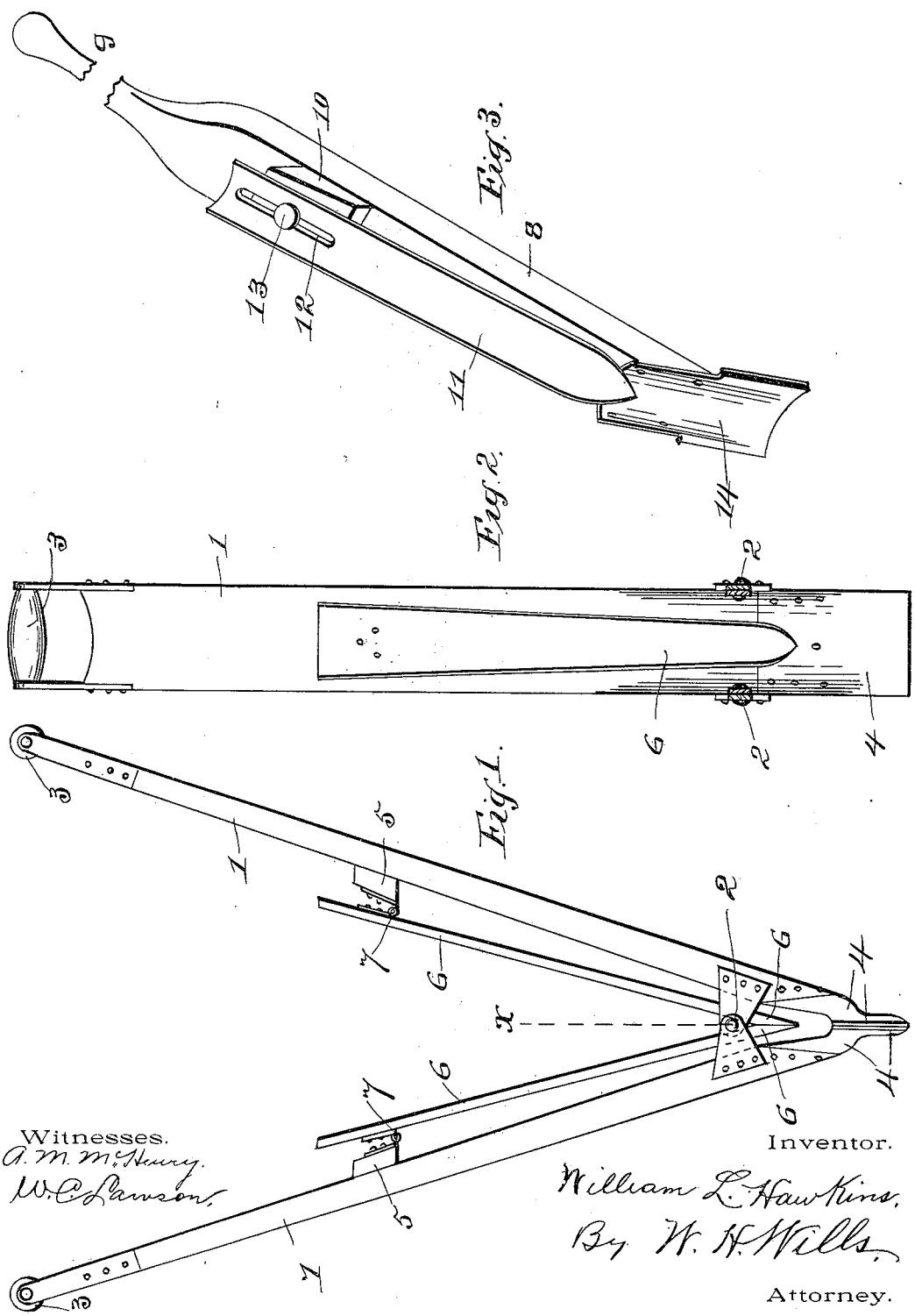

WILLIAM L. HAWKINS, OF BRUMLEY, MISSOURI, ASSIGNOR OF ONE-HALF TO HENRY D. WALL, OF SAME PLACE.

TRANSPLANTER.

SPECIFICATION forming part of Letters Patent No. 621,302, dated March 14, 1899.

Application filed April 30, 1898. Serial No. 679,328. (No model.)

*To all whom it may concern:*

Be it known that I, WILLIAM L. HAWKINS, a citizen of the United States, residing at Brumley, in the county of Miller and State of Missouri, have invented certain new and useful Improvements in Transplanters, of which the following is a specification.

This invention relates to transplanters; and the object of the invention is to provide a transplanting implement of novel and peculiar construction and arrangement of parts.

A further object of the invention is to provide a transplanter having guide members to hold the upper portion or part of the plant exposed above the ground.

A still further object of the invention is to provide a transplanter having guide members adapted to be opened simultaneously with the closing of the spade-jaws and closed simultaneously with the opening of said jaws.

In the accompanying drawings, forming part of this application, Figure 1 is an elevation of the transplanter in position to be inserted into the ground. Fig. 2 is a central vertical section on line x, Fig. 1. Fig. 3 is a perspective view of a lever, showing a modification.

The same numeral references denote the same parts throughout the several figures of the drawings.

The levers 1 are pivoted or hinged together at 2 and have suitable handles 3. The lower ends of the levers are beveled and concaved and provided with concaved spade jaws or blades 4, secured in said concavities and extending a suitable distance below said lower ends of the levers to be inserted into the ground around the roots and body of the plant to be removed.

The levers 1 have inner projections or lugs 5, to which one end of the guide members 6 are connected by hinges 7. The other ends of said members are pointed and left free. These guide members 6 are concaved throughout their length, said concavity increasing from the top to the bottom end, which end overlaps the upper portion of the jaws 4, so that the portion of the plant just above the ground is grasped by the said ends simultaneously with grasping of the spade-jaws 4 upon the planted portion of the plant to remove the latter. In transplanting the guide members hold the plant and are simultaneously closed at their upper portion with the opening of the spade-jaws to guide and drop or replant the plant.

It will be observed that the hinges permit the levers 1 to be moved apart in order to close the spade-jaws without closing the bottom ends of the clamping members too close upon the plant.

In Fig. 3 is shown a lever 8, having an integral handle 9, and a slanting or inclined lug or projection 10. The guide member 11 has a slot 12 and is adjusted vertically on said projection by a set-bolt 13, so as to put the point of said member farther down between the spade-blades 14 when entering a deep-seated plant.

Having thus described my invention, what I claim as new, and desire to secure by Letters Patent, is—

1. A transplanter comprising pivoted levers, spade-jaws secured to the levers, and guide members having one end connected to said levers and the other end left free, said members being concaved throughout their length.

2. A transplanter comprising the levers pivoted together, spade-jaws secured to the levers, and the concaved guide members having one end connected to said levers and the other end left free and terminating in a point depending between said jaws.

In witness whereof I have hereunto set my hand in the presence of two witnesses.

WILLIAM L. HAWKINS.

Witnesses:
HENRY D. WALL,
GEO. S. WRIGHT.